(12) United States Patent
Drewes

(10) Patent No.: US 10,001,185 B2
(45) Date of Patent: Jun. 19, 2018

(54) BRAKE UNIT

(71) Applicant: SAF-HOLLAND GmbH, Bessenbach (DE)

(72) Inventor: Olaf Drewes, Aschaffenburg (DE)

(73) Assignee: SAF-HOLLAND GMBH, Bessenbach (DE)

( * ) Notice: Subject to any disclaimer, the term of this patent is extended or adjusted under 35 U.S.C. 154(b) by 234 days.

(21) Appl. No.: 14/903,495

(22) PCT Filed: Aug. 12, 2014

(86) PCT No.: PCT/EP2014/067250
§ 371 (c)(1),
(2) Date: Jan. 7, 2016

(87) PCT Pub. No.: WO2015/028304
PCT Pub. Date: Mar. 5, 2015

(65) Prior Publication Data
US 2016/0169308 A1  Jun. 16, 2016

(30) Foreign Application Priority Data

Aug. 27, 2013 (DE) .................. 10 2013 217 065

(51) Int. Cl.
*F16D 65/22* (2006.01)
*F16D 51/00* (2006.01)
(Continued)

(52) U.S. Cl.
CPC .............. *F16D 65/22* (2013.01); *B60T 1/067* (2013.01); *F16D 51/00* (2013.01); *F16D 51/14* (2013.01);
(Continued)

(58) Field of Classification Search
CPC .......... F16C 65/22; F16C 65/28; F16C 51/00; F16C 51/14; F16C 51/24; B60T 1/067
See application file for complete search history.

(56) References Cited

U.S. PATENT DOCUMENTS 3,576,152 A * 4/1971 Chevreux ............. B60T 17/083
188/170
4,085,830 A * 4/1978 Bottoms ................. F16D 65/22
188/196 D
(Continued)

FOREIGN PATENT DOCUMENTS

AU  2014314484  1/2016
CN  1442621  9/2003
(Continued)

OTHER PUBLICATIONS

European Patent Office; International Search Report, dated Nov. 7, 2014.

*Primary Examiner* — Vishal R Sahni
(74) *Attorney, Agent, or Firm* — Price Heneveld LLP

(57) ABSTRACT

A brake unit for utility vehicles includes a carrier unit and a transmission element. The carrier unit has a guide section in which the transmission element can be arranged such that the transmission element can be moved along a guide axis. The transmission element includes a first receiving section, which can be engaged with a piston rod of a brake cylinder, and a second receiving section, which can be engaged with a tappet of a wedge unit. The transmission element is configured to transfer forces and transfers along the guide axis between the piston rod and the tappet.

21 Claims, 4 Drawing Sheets

(51) Int. Cl.
*F16D 51/24* (2006.01)
*F16D 65/28* (2006.01)
*B60T 1/06* (2006.01)
*F16D 51/14* (2006.01)
*F16D 51/60* (2006.01)
*F16D 121/04* (2012.01)

(52) U.S. Cl.
CPC ............ *F16D 51/24* (2013.01); *F16D 65/28* (2013.01); *F16D 51/60* (2013.01); *F16D 2121/04* (2013.01)

(56) References Cited

U.S. PATENT DOCUMENTS

| | | | | |
|---|---|---|---|---|
| 4,369,863 | A * | 1/1983 | Farr | F16D 51/18 188/106 A |
| 4,469,015 | A * | 9/1984 | Clark | F16D 65/22 188/343 |
| 4,478,137 | A * | 10/1984 | Clark | F16D 65/22 277/346 |
| 4,611,691 | A * | 9/1986 | Gornall | F16D 55/18 188/71.8 |
| 6,415,896 | B1 | 7/2002 | Arai | |
| 2015/0246667 | A1* | 9/2015 | Shimomura | F16D 65/28 188/166 |
| 2016/0169308 | A1 | 6/2016 | Drewes | |

FOREIGN PATENT DOCUMENTS

| | | |
|---|---|---|
| CN | 2921438 | 7/2007 |
| CN | 102817946 | 12/2012 |
| DE | 1555224 | 3/1972 |
| DE | 102008003527 | 8/2009 |
| DE | 102011088851 | 6/2013 |
| DE | 102013217065 | 3/2015 |
| EP | 3039311 | 7/2016 |
| FR | 2657664 | 8/1991 |
| GB | 1418630 | 12/1975 |
| WO | 2015028304 | 3/2015 |

* cited by examiner

BRAKE UNIT

BACKGROUND OF THE INVENTION

The present invention relates to a brake unit, in particular for use in utility vehicles.

The subject-matter of the invention is in particular brake units designed as wedge brake drums. Basic constructive features of such brake units are already known from the prior art. Usually, a wedge arrangement applies a force onto the brake shoes of a drum brake, the brake shoes are pushed against the inside of a brake drum and thus carry out the braking operation. Up to now, the wedge, in turn, has been driven by a brake cylinder specifically adapted for wedge drum brakes, wherein it was not easily possible to use also for drum brake units, brake cylinders used in brake systems with disk brakes. In particular since disk brakes and also the corresponding brake cylinders are much more widespread in the field of utility vehicles, the brake cylinders for disk brakes are usually manufactured in larger numbers than the special brake cylinders for wedge drum brakes and are therefore less expensive. In addition, it is much more difficult to attach a wedge drum brake cylinder to the corresponding wheel suspension of the utility vehicle than to simply attach a disk brake cylinder, for which standardized interface dimensions may be used.

The object underlying the present invention is to improve a wedge drum brake system such that it is easily possible to attach any brake cylinder while at the same time reducing wear and allowing for a simpler mounting.

SUMMARY OF THE INVENTION

According to the invention, the brake unit comprises a carrier unit and a transmission element, wherein the carrier unit has a guide section, in which the transmission element can be arranged such that it can be moved along a guide axis, wherein the transmission element comprises a first receiving section, which can be engaged with a piston rod of a brake cylinder, and a second receiving section, which can be engaged with a tappet of a wedge unit, wherein the transmission element is designed to transfer or transmit forces and transfers or displacements along the guide axis between the piston rod and the tappet. The carrier unit comprises preferably the brake carrier of a conventional drum brake system and has a guide section. The guide section in turn is preferably a bore or a channel in the carrier unit and, due to the condition of the inner surface thereof, it is adapted in particular to guide the transmission element along a guide axis and to allow for an easy sliding or easy displacement of the transmission element along the guide axis. To this end, the guide section has preferably a particularly smooth surface or is provided with a coating, which allows for an easy sliding and little wear due to friction. The transmission element has preferably an outer geometry corresponding to the inner geometry of the guide section or is preferably identical to the inner geometry of the guide section. Furthermore, the transmission element has preferably at its first end along the guide axis a first receiving section adapted to come into engagement with the piston rod of a brake cylinder. Furthermore, the transmission element has at the end opposite its first end a second receiving section, which may be brought into engagement with the tappet of a wedge unit. During the operation of the brake unit, preferably the piston rod of the brake cylinder by applying a compressive force, which is exerted by means of hydraulics or pneumatics, for example, is moved in the direction of the transmission element, engages at the first receiving section of the transmission element and transmits a force to the transmission element so that said force displaces the latter along the guide axis in the direction of the tappet or in the direction of the wedge unit. In this displacement movement, the transmission element, with its second receiving section in turn engages at the tappet of the wedge unit and displaces the tappet also along the guide axis in the direction of the wedge unit. During this displacement—as it is known from the prior art—in the wedge unit a wedge-shaped geometry is displaced such that the brake shoes of the drum brake are pushed against the inside of the brake drum by the wedge unit. The transmission element is preferably a component formed separate from the piston rod of the brake cylinder, since in this way, in the case of wear on the transmission element or on the piston rod, it is possible to replace only one of the components. Preferably, the piston rod transmits a force to the transmission element in one direction only and, in the opposite direction, it is not secured at the transmission element. In this way, the brake cylinder with its piston rod may be easily removed from the wedge unit, wherein no form-fitting or force-fitting connection between the piston rod and the transmission element has to be released or overcome beforehand.

Preferably, the first receiving section and the second receiving section are arranged at two opposite sides of the transmission element and arranged essentially coaxially relative to each other. In this context, as coaxial arrangement of the two receiving sections, preferably an arrangement of the receiving sections is defined such that the cross-sections of the respective receiving sections or of the transmission element, which cross-sections lie transverse to the guide axis in the respective receiving section, have an area center lying on an axis parallel to the guide axis. The area centers of both receiving sections lie preferably on the guide axis. When the area centers of the cross-sections of the receiving sections are oriented coaxially, it may preferably be avoided that during the force transmission to the transmission element, force components occur, which act transverse to the guide axis and thus may lead to a canting or tilting of the transmission element.

Preferably, the point of force transmission from the piston rod to the transmission element and the point of force transmission from the tappet to the transmission element lie on the guide axis. Particularly preferably, the transmission element is formed such that the area centers lie in all cross-sections transverse to the guide axis or particularly preferably perpendicular to the guide axis exactly on the respective guide axis. This means that for example in the case of a rectangular cross-section, the intersection of the diagonals of the rectangle lies preferably on the guide axis. In the case of a circular or cylindrical cross-section, the respective centers of the circular cross-sections lie on the guide axis. In addition, it is provided that the force transmission from the piston rod and tappet to the transmission element takes place preferably also in the area of the guide axis, in particular in order to prevent a sideways turning or tilting and a resulting canting of the transmission element in the guide section.

Particularly preferably, the transmission element in the first receiving section and/or in the second receiving section and/or between the receiving sections has a rigid material. The rigid material preferably serves to transmit the great braking forces applied by the brake cylinder as directly and straightly to the wedge unit as is possible and thus makes it possible to achieve the brake effects desired by the user of the brake as straightly and immediately as is possible. Here, however, the rigid material has to exhibit a certain toughness and may not be prone to brittle failure in order to be able to stand the high forces and possibly shocks from the brake system or from the brake cylinder. A preferred material for the section of rigid material of the transmission element is a steel or a similarly hard or strong material from the field of fiber composites. Preferably, the rigid material has a cylindrical shape and extends over the entire area between the first receiving section and the second receiving section. Alternatively preferably, also only individual areas between the first and the second receiving sections could be reinforced by a rigid material, wherein in addition also a vibration-reducing or slightly elastic material may be provided, in particular in order to be able to dampen or absorb high-frequency vibrations of the entire brake system.

Further preferably, the transmission element, in the first receiving section and/or in the second receiving section, has a wear-reducing material. In the force transmission between the piston rod and the transmission element and between the tappet and the transmission element, high loads or high local loads on the material of the transmission element occur in the receiving sections. For example, in the area of the direct contact between the piston rod and the transmission element or between the tappet and the transmission element, local load peaks due to Hertzian surface pressure may occur, which strongly impair the material of the transmission element or of the receiving section locally and which may cause pitting or similar damage to the material, for example. For this reason, it is preferred to provide the receiving sections with a particularly resistant or particularly hard material, which prolongs the service life of the entire transmission element and ensures a reliable functioning of the brake unit. In this case, a metal insert or a metal coating as well as a fiber-reinforced ceramic material or a Teflon coating is possible as a particularly wear-reducing material.

Further preferably, the transmission element has a slide section adapted to slide on the guide section expediently with little clearance, wherein the slide section preferably comprises a wear-reducing material. The slide section of the transmission element is preferably the surface or preferably a plurality of surfaces, which rest against the guide section with sufficient clearance and which support the transmission element relative to the guide section and allow for guiding the transmission element along the guide axis. Here, the slide section may be made preferably from a polymer, which slides particularly easily, or be coated with such a material, wherein the polymer preferably slides on the surface of the guide section with a low coefficient of friction. Further preferably, a sliding lacquer may be used.

In a particularly preferred embodiment, the slide section has two cylinder sections, on the lateral surfaces of which the transmission element is guided in the guide section, wherein the guide sections are spaced apart from each other along the guide axis and separated by an intermediate space. In particular in order to save weight, the transmission element may be formed not as a solid body but two or preferably a plurality of individual cylinder sections may be arranged on the transmission element. The cylinder sections are preferably disk-shaped or slice-shaped and there are intermediate spaces between the cylinder sections, making it possible to particularly preferably save weight and also to reduce the material costs of the transmission element. Further preferably, the cylinder sections have a web-like or spoke-like structure. Thus, it may be achieved that the strength of the cylinder sections is sufficiently great and that nevertheless a considerable amount of weight is saved.

Particularly preferably, the cylinder sections are arranged along the guide axis at the same height as along the receiving sections.

In a preferred embodiment, the slide section has a projection or a recess, which may be made to engage with a corresponding recess or projection of the guide section, in order to secure the transmission element against rotation about the guide axis relative to the carrier unit. A corresponding recess is preferably formed as a groove running parallel to the guide axis, the groove being provided either on the guide section or on the slide section and being engageable into a projection arranged on the respective other element such that a rotation of the transmission element about the guide axis relative to the carrier unit is prevented. Alternatively to such a projection or recess on the slide section or on the guide section, there could also be provided a rectangular or non-circular cross-section of the slide section and of the guide section, which also prevents a rotational movement of the transmission element.

In a particularly preferred embodiment, the guide section has a wear-reducing coating. Particularly preferably, the material of the coating is an optimum friction partner of the material of the slide section, i.e. a friction partner with a particularly low coefficient of friction. Preferably, a sliding lacquer or a silicone-containing coating or a polyamide-based coating may be provided on the guide section. Further preferably, a surface hardening process may be used, which further reduces the proneness to wear of the guide section so that the transmission element slides in the guide section while there is as little friction and wear as is possible.

Preferably, the transmission element has a maximum length along the guide axis and a maximum width transverse to the guide axis, wherein the relationship of the width to the length is in a range of 0.5-2, preferably of 0.8-1.6, and most preferably of about 1.2-1.4. The smaller the relationship of the width to the length, the greater the ability of the transmission element to prevent canting or tilting despite a possible oblique load, i.e. a load with force components transverse to the guide axis, and to continue transmitting forces between the tappet and the piston rod along the guide axis with as little friction as is possible. On the other hand, when a small relationship is selected, the space requirements of the transmission element along the guide axis become too big, resulting in a lower limit of the relationship of width to length of 0.5. For the maximum value of 2 of the relationship, tests have shown that despite the very compact design of the transmission element, the transmission element is capable of preventing canting or tilting to a sufficient degree even if there is slightly more clearance between the slide section and the guide section and possibly an oblique load. In particular the value of the relationship of 1.2-1.4 may ensure a favorable compromise between a compact design of the transmission element and sufficient safety against canting of the transmission element in the guide section.

Further preferably, the first receiving section and/or the second receiving section has/have a recess or a funnel-shaped cavity extending in the direction of the guide axis and into which the respective corresponding piston rod or tappet may be inserted. Particularly preferably, the funnel-shaped cavity of the receiving sections is adapted such that a possible tilting of the tappet and of the piston rod will not be directly transmitted by a torque to the transmission element. It is further preferred that the receiving sections are arranged relatively close together, i.e. that relatively little material is provided between the receiving sections, while the slide section has a larger extension along the guide axis so as to be able to exert a sufficiently high leverage force in particular in the case of an oblique load, wherein the leverage force secures the transmission element against canting in the guide section.

It is in particular preferred that the recess or the funnel-shaped cavity of the first and/or second receiving section(s) has an opening angle, wherein the opening angle has values of 5°-45°, preferably of 15°-30°, and most preferably of about 23°-25°. For the preferred case that the funnel-shaped cavities of the first and/or second receiving section(s) has/have only a very small opening angle α, the remaining wall between the cavity and the outer surface of the slide section of the transmission element is as thick as is possible and, thus, also comparatively stable and may absorb large leverage forces or transverse forces and prevent tilting of the transmission element. The larger the opening angle of the cavity is chosen, the larger is also the range, within which the tappet and the piston rod may tilt relative to the transmission element without transmitting a leverage force to the transmission element. The range of 15°-30°, and in particular the range of 23°-25° has proven to be a particularly advantageous range, which ensures a good compromise between a sufficient strength of the remaining wall and a sufficiently great mobility of the tappet and of the piston rod relative to the transmission element.

Further preferably, the first and/or second receiving section(s) has/have a receiving surface, wherein the first receiving surface has a first mean radius of curvature, and wherein the second receiving surface has a second mean radius of curvature, and wherein the first radius of curvature is preferably larger than the second radius of curvature. In this context, as receiving surface there is defined that part of the surface of the first or of the second receiving section, which comes into contact with the tappet or the piston rod. Particularly preferably, the first or the second receiving surface is concavely curved so that a preferably convexly curved contact region on the piston rod and on the tappet may engage as accurately as is possible into the respective receiving surface and a force may be transmitted onto the transmission element as plainly as is possible while avoiding local stress peaks. Particularly preferably, the radius of curvature of the first receiving surface is larger than the second radius of curvature of the second receiving surface since in almost all common configurations of known brake units the piston rod will be made thicker and thus also with a larger radius of curvature of the contact surface thereof than the tappet of the wedge unit.

Preferably, the relationship of the first radius of curvature to the second radius of curvature is 1-3, preferably 1.2-2, and most preferably about 1.5-1.6. It has been shown that with a range of relationship of 1-3, which is as large as is possible, almost all common brake systems may be provided with a brake unit according to the present invention, wherein nevertheless still a sufficient guiding accuracy of the piston rod and of the tappet on the transmission element or on the receiving surfaces of the transmission element is ensured. If the relationship of the first radius to the second radius is chosen in a range of 1.2-2, a higher guiding accuracy may be achieved, i.e. the radius of curvature is better adapted to common radius of curvature of the piston rods and tappets available on the market, but does nevertheless offer reserves for a possible deviation of dimension. The particularly preferred range of the relationship of the radius of curvature relative to each other of 1.5-1.6 is very suitable for a particularly widespread design of the piston rod of the brake cylinder and of the tappet of the wedge unit, which is provided standardly.

It is in particular preferred that the guide section has a limit stop limiting the displaceability of the transmission element along the guide axis in one direction. The limit stop of the guide section is preferably a projection on the guide section pointing inwards, on which the transmission element abuts when no force is transmitted from the brake cylinder via the piston rod to the transmission element. Particularly preferably, the limit stop is arranged on that side of the guide section, which points towards the brake cylinder. Here, the limit stop preferably serves to prevent that the transmission element gets out of the guide section when the brake cylinder is removed. Particularly preferably, the limit stop may also be designed as a safety ring or as a snap ring, which is sunk into a groove provided on the guide section. In this way, particularly preferably, the limit stop may be removed from the guide section, and the transmission element may be taken out of the guide section.

Preferably, the transmission element is pretensioned in the direction of the piston rod. The pretensioning of the transmission element is preferably applied by a spring element, such as a spiral spring, which rests against the transmission element on the side facing towards the wedge unit. Here, the spring element preferably rests against the wedge unit or a respective abutment geometry of the carrier unit and preferably exerts a force onto the tappet transmitting said force in the second receiving section onto the transmission element. As a consequence of the pretension, the transmission element rests either against the limit stop of the carrier unit or with its first receiving section against the piston rod. In the case of a pretensioning of the transmission element in the direction of the piston rod, it is advantageous that, on the one hand, the idle travels of the piston rod may be minimized and, thus, when the brake is actuated, the piston rod already rests directly against the transmission element. In the preferred embodiment, in which the spring element engages into the tappet, advantageously the tappet is displaced out of the wedge unit, when no braking force is applied by the brake cylinder. Advantageously, in this embodiment, the spring element causes the brake unit to be released more easily.

Particularly preferably, the carrier unit has a base body and a bracing element, wherein the guide section is arranged within the bracing element and wherein the bracing element may be inserted into a cavity on the base body and be attached on the base body in a force-fitting and/or form-fitting manner. The base body of the carrier unit is preferably the base body of a brake carrier, producing a firm connection between the brake system and the axle body of a utility vehicle. In a cavity provided on the base body, preferably a bracing element may be inserted, wherein the bracing element is particularly preferably also designed hollow and forms the guide section in the cavity thereof. In this way, it is possible that when the brake unit is mounted, at first the transmission element is inserted into the bracing element or into the guide section provided in the bracing element and then both parts are attached to the base body. In particular in case the transmission element is to be pretensioned by a resetting element in the direction facing away from the wedge unit, this makes mounting easier since the bracing element may be inserted in the base body in the direction of the wedge unit and then the pretension may be adjusted while the bracing element is screwed into the base body or while the bracing element is attached in a form-fitting manner to the base body. Particularly preferably, on the bracing element, a thread may be provided, which engages into a thread provided on the base body. Alternatively, for example, an arrangement of groove and lock ring could be provided on the bracing element, wherein a lock ring or a snap ring may be inserted into a groove provided on the outside of the tension element and rests against the base body. By arranging the guide section at a separately formed bracing element, among other things the surface coatings or surface treatments may be done more easily than if the guide section were provided on the base body of the carrier unit. Due to the small size of the bracing element relative to the base body, the working of the surfaces, in particular of the guide section, is possible with less effort than this would be the case for a surface treatment of the complete base body.

Particularly preferably, the bracing element is held on the base body by a sleeve element, wherein between the tension element and the sleeve element a force fit and/or form fit may be produced. The sleeve element may preferably be formed as a simple nut with an internal thread, wherein the nut may be screwed onto an outer thread of the bracing element, which is preferably put through the cavity of the base body of the carrier unit and projects on the opposite side so that in this way the bracing element is attached to the base body. This embodiment makes it easier to manufacture the brake unit since a thread need no longer be cut into the base body of the carrier unit and the base body may be formed as a simple casting, which requires only little remachining.

Further preferably, the sleeve element may have a bore forming at least in regions the guide section. The use of a bracing element and of a sleeve element in particular has the advantage that for said two elements harder materials may be used than for the entire base body of the carrier unit. Thus, the latter may for example be made from a simple gray cast iron while for the bracing element and the sleeve element high-strength materials such as nodular cast iron or forged steel parts may be used, which have a better surface quality and corrosion resistance or friction resistance. This considerably reduces material costs since it is not the entire carrier unit, which needs to be formed from high-strength and expensive materials. The use of a bracing element and of a sleeve element and the screwing together of said two parts from two sides of the cavity of the base body simplifies in particular the mounting of the brake unit. It is particularly preferred that the sleeve element is formed as an integral part of the wedge unit, wherein the wedge unit rests against the base body in the case of a surface standing transverse to the guiding direction. The mounting of the brake unit may be further simplified in that the sleeve element is formed one-piece on the wedge unit, wherein the wedge unit is simply positioned on the base body of the carrier unit and then by means of the bracing element forced against the base body and thus attached thereto. If in this case the guide section is arranged in the sleeve element, the transmission element may be arranged in the sleeve element, which is formed one-piece with the wedge unit, and then the unit of wedge unit and sleeve element may be attached to the base body by means of the bracing element. In addition, preferably the part of the guide section provided on the bracing element may have the limit stop, which prevents that the transmission element gets out at the guide section provided on the sleeve element.

As a matter of course, the features of the carrier unit and of the transmission element, which refer to the respective corresponding geometries of the wedge unit and of the brake cylinder, do not necessarily include that the presence of a brake cylinder and of a wedge unit is necessary for the present invention. Only the corresponding geometries, i.e. in particular the receiving sections on the transmission element or the respective arrangement of the bracing element and of the sleeve element, have to be designed such that they may advantageously come into function with said adjacent systems. An important object underlying the present invention is also to simplify the mounting of a brake unit, wherein the individual components of the invention may also be present in the unmounted state, in which an actual force transmission or an actual functional context between the individual components is understandably not yet given.

Further advantages and features of the invention become apparent from the following description with reference to the appended Figures. As a matter of course, individual features shown in the individual Figures may also be used in embodiments of other Figures and are not limited to the respective feature combinations.

DETAILED DESCRIPTION OF THE PREFERRED EMBODIMENTS

Figure 1:
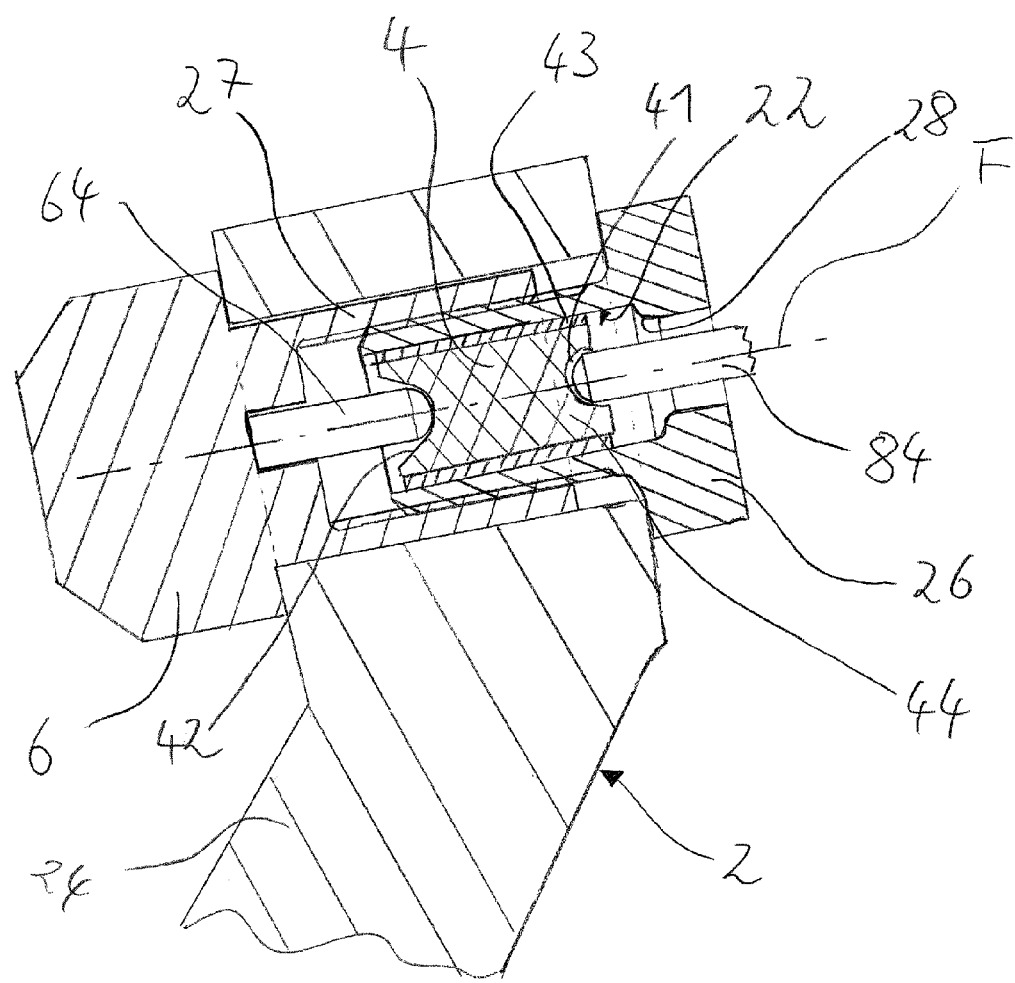
FIG. 1 shows a sectional view of a first preferred embodiment of the brake unit of the invention.

In the preferred embodiment shown in FIG. 1, the carrier unit 2 has a base section 24, in the cavity of which a sleeve element 27 as well as a bracing element 26 are arranged. The bracing element 26 is preferably formed as a hollow screw/bolt, which has an outer thread and may be made to engage with a corresponding internal thread of the sleeve element 27. Here, the bracing element 26 preferably rests against a surface of the base body 24 of the carrier unit 2, standing transverse or preferably perpendicular to the guide axis F. Equally preferably, the wedge unit 6, which is formed one-piece with the sleeve element 27, rests against a corresponding surface of the base body 24, standing transverse or preferably perpendicular to the guide axis F. As a matter of course, the bracing element 26 has preferably corresponding engagement geometries such as a hexagon head or a hexagonal recess in order to be able to exert a torque on the bracing element so as to be able to brace the latter against the sleeve element 27. In the cavity provided on the bracing element 26, the guide section 22 is arranged, in which the transmission element 4 is movably secured along the guide axis F. Here, the guide section 22 prevents a displacement of the transmission element transverse to the guide axis F. Further preferably, the guide section 22 has at one of its ends a limit stop 28, wherein the limit stop 28 shown in the Figure preferably prevents that the transmission element 4 gets out of the guide section 22 towards the right-hand side of the Figure. The limit stop may also be part of a sealing element, which seals the guide section 22 from the environment and thus prevents the entry of dirt etc. When seen from the right in the Figure, a piston rod 84 of a brake cylinder (not shown in the Figure) engages at the transmission element 4, the piston rod exerting a force onto the transmission element 4 in order move the latter to the left. On the left-hand side of the transmission element 4, the tappet 64 of a wedge unit 6 engages, wherein the transmission element 4, driven by the piston rod 84, applies a force to the tappet 64 and forces the latter to the left in the Figure. Further details of the wedge unit 6 are assumed as being known to the skilled person and are not explained in greater detail here. The guide section 22 as well as the transmission element 4 are particularly preferably designed rotationally symmetric about the guide axis F. Alternatively preferably, also a rectangle or an otherwise polygonal cross-section could be provided. At its outer surface facing towards the guide section 22, the guide element 4 has a slide section 43, which is in particular formed from a material forming a good friction pairing with the material of the guide section 22 in order to be able to slide along the latter with as little friction as is possible. At its side facing towards the piston rod 84, the transmission element 4 has a first receiving section 41, which is preferably designed rounded and may be made to engage as accurately as is possible with the contact geometry, i.e. the geometry on the left-hand side of the piston rod 84. On the side facing towards the tappet 64, the transmission element 4 has preferably a second receiving section 42 which—as is shown in the Figure—is preferably funnel-shaped and has a rounded surface in the contact area with the tappet 64. In the embodiment shown in the Figure, the first radius of curvature $R_{41}$ of the first receiving section 41 is approximately the same as a second radius of curvature $R_{42}$ of the second receiving section 42 (cf. also FIG. 2a). The relationship between the first and the second radius of curvature therefore assumes a preferred relationship of about 0.9-1.1. It is further preferred that the second receiving section 42 is funnel-shaped in order to ensure a certain clearance in particular when the tappet 64 is tilted and in order to prevent that the tappet 64 transmits a torque onto the transmission element 4.

Figure 2A:
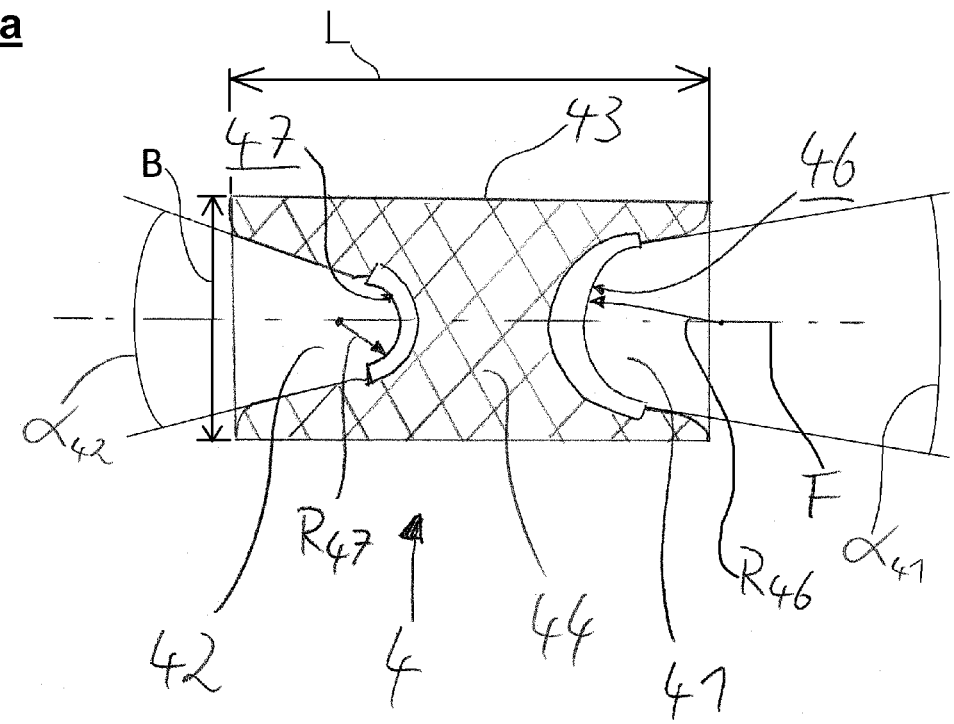
FIGS. 2a-2d show views of different embodiments of a transmission element of the invention.

FIG. 2a shows a sectional view of a preferred embodiment of the transmission element 4 of the invention. Here, it can be seen that preferably the first receiving section 41 and the second receiving section 42 are funnel-shaped, wherein the first receiving section 41 has an opening angle of $\alpha_{41}$ and the second receiving section 42 has an opening angle of $\alpha_{42}$. It is further shown that the transmission element 4 is essentially made from a rigid material 44, which allows for a particularly good force transmission from the first receiving section 41 to the second receiving section 42. It is further preferred that the transmission element 4 is provided with a material reinforcement in the area of the first receiving surface 46, wherein, as is shown, the material reinforcement may be designed preferably as a hemisphere or semicircular insert. Analogously, preferably the second receiving section 42 also has a reinforcement of its second receiving surface 47, which may be formed by a metal insert or alternatively preferably also by a respective wear-reducing coating. The first receiving surface 46 preferably has a mean radius of curvature $R_{46}$, which is particularly preferably larger than the second mean radius of curvature $R_{47}$ of the second receiving surface 47. Preferably, the transmission element 4 has a length L along the guide axis F, which is larger than the width B of the transmission element transverse to the guide axis F. At its outer surface, the transmission element 4 preferably has a slide section 43, which particularly preferably may be slidingly arranged with little clearance fit in the guide section 22 of the carrier unit 2.

Figure 2B:
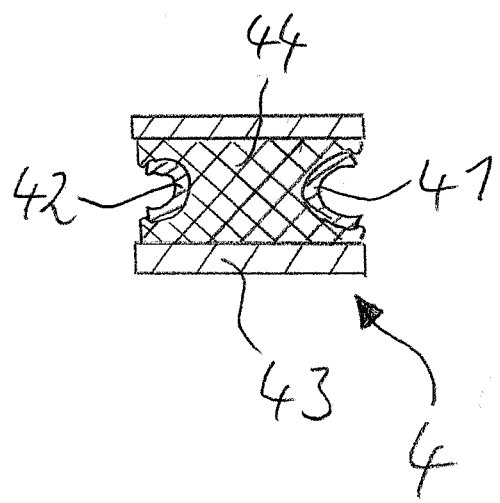

FIG. 2b shows a further preferred embodiment of the transmission element 4 of the invention, wherein in contrast to the embodiment shown in FIG. 2a the first receiving section 41 and the second receiving section 42 are not formed funnel-shaped but only rounded and wherein the slide section 43 is preferably a separately formed part, which may then be attached to the rigid material 44 of the transmission element 4 by means of a substance-to-substance bond, for example. This may be done by means of adhesive or vacuum deposition processes, for example.

Figure 2C:
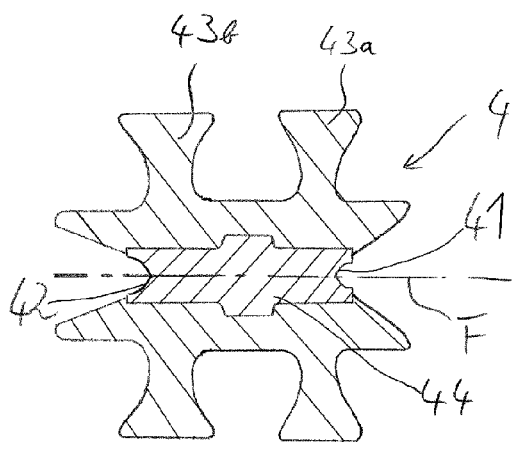

FIG. 2c shows a further preferred embodiment of the transmission element of the invention, wherein the slide section 43 preferably is formed from two cylinder-shaped sections 43a and 43b. Further preferably, the rigid material 44 of the transmission element 4 is arranged as a preferably cylinder-shaped insert between the first receiving section 41 and the second receiving section 42 and thus serves for a direct, mostly unsprung or undamped force transmission between the piston rod 84 and the tappet 64.

Figure 2D:
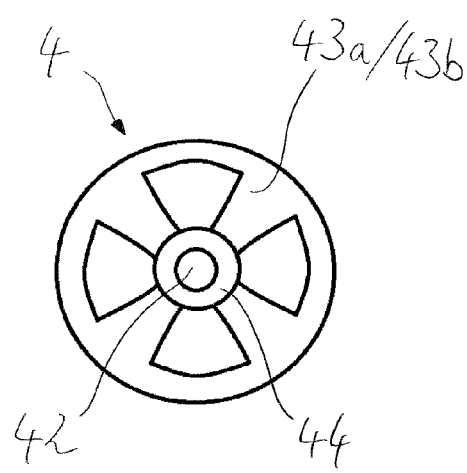

FIG. 2d shows a view of the transmission element 4 shown in FIG. 2c along the guide axis F, wherein it is shown that the second cylinder section 43b preferably has spoke-shaped geometries, allowing for a further reduction in weight.

Figure 3:
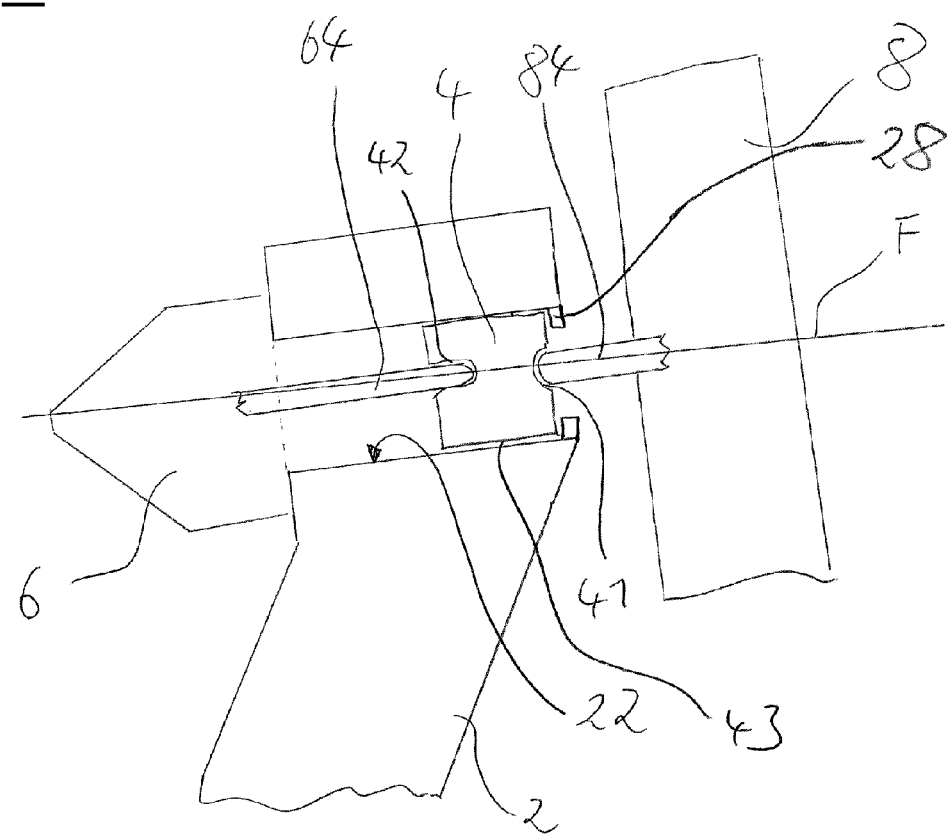
FIG. 3 shows a simplified schematic sectional view of a preferred embodiment of the brake unit of the invention.

FIG. 3 shows a further embodiment of the brake unit of the invention, in which the guide section 22 is arranged directly in the carrier unit 2 or directly in the base body 24 of the carrier unit 2. To put it differently, the carrier unit 2 in this case has no bracing element 26 and no sleeve element 27. Here, the wedge unit 6 and the brake cylinder 8 are attached to the carrier unit 2 by means of flanges and screw joints in a manner known from the prior art. As a matter of course, in a carrier unit 2 designed in this way, the number of components to be mounted is as small as is possible so that the mounting effort may be reduced since few individual components need to be mounted.

Figure 4:
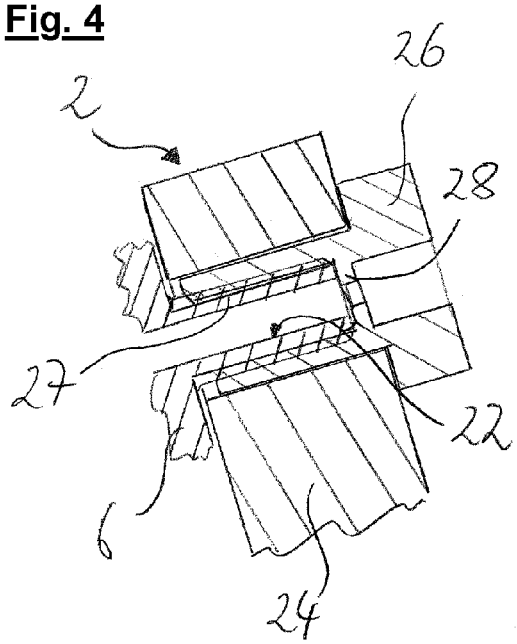
FIG. 4 shows a further sectional view of a preferred embodiment of the brake unit of the invention.

FIG. 4 shows a further preferred embodiment of the carrier unit 2 of the invention, wherein the carrier unit has a base body 24, in which a bracing element 26 is inserted, wherein the bracing element preferably is hollow-shaped and has an internal thread at its inside, into which in turn a sleeve element 27 engages. The sleeve element 27 is preferably formed one-piece with the wedge unit 6 and, at its inside, it has a cavity, which particularly preferably is the guide section 22 of the carrier unit 2. An advantage of this embodiment is that by means of the one-piece design of the sleeve element 27 and the wedge unit 6, a small number of parts to be mounted is required, wherein also the advantage that the guide section 22 is arranged not in the base body 24 of the carrier unit 2 and an easier workability of the surfaces may be achieved.

Figure 5:
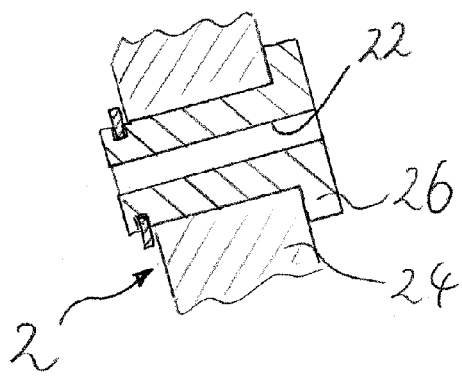
FIG. 5 shows a further sectional view of a preferred embodiment of the brake unit of the invention.

FIG. 5 shows a further embodiment of the carrier unit 2 of the invention, wherein the bracing element 26 is preferably attached in a form-fitting manner to the base body 24 of the carrier unit 2 by means of a groove and tongue connection. Furthermore, the bracing element 26 has a cavity, which forms the guide section 22 of the carrier unit.

Figure 6:
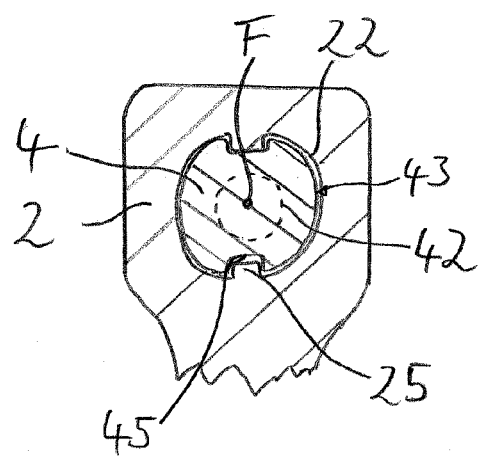
FIG. 6 shows a further sectional view of a preferred embodiment of the brake unit of the invention.

FIG. 6 shows a sectional view of a preferred embodiment of the brake unit of the invention, wherein the carrier unit 2 and the transmission element 4 preferably each have a respective projection or recess 25, 45, which may be engaged with the respective corresponding recess or projection 45, 25 in order to rotationally secure the transmission element 4 in the carrier unit. Here, the projections may be formed as continuous rails or individual noses while the recesses are formed as grooves with preferably the length of the movement range of the transmission element 4. Advantageously, in this way a preferred mounting position of the transmission element 4 relative to the carrier unit 2 may be fixed, for example in order to be able to adjust strengths of the transmission element 4 to certain load directions.

As a matter of course, within the scope of the present invention, individual features, which are possibly shown in one of the Figures only, may also be used in further embodiments insofar as they are not excluded explicitly or in view of technical considerations.

LIST OF REFERENCE SIGNS

2—carrier unit
4—transmission element
6—wedge unit
8—brake cylinder
22—guide section
24—base body
25—projection or recess
26—bracing element
27—sleeve element
28—limit stop
41—first receiving section
42—second receiving section
43—slide section
44—stiff material
45—projection or recess
46—receiving surface
47—receiving surface
64—tappet
84—piston rod
$\alpha_{41}$—opening angle
$\alpha_{42}$—opening angle
B—width
F—guide axis
L—length
$R_{46}$—radius
$R_{47}$—radius

The invention claimed is:

1. A brake unit for utility vehicles, comprising:
a carrier unit; and
a transmission element;
wherein the carrier unit has a guide section, in which the transmission element is arranged such that the transmission element can be moved along a guide axis;
wherein the transmission element comprises a first receiving section configured to be engaged with a piston rod of a brake cylinder, and a second receiving section configured to be engaged with a tappet of a wedge unit;
wherein the transmission element is configured to transmit forces and displacements along the guide axis between the piston rod and the tappet;
wherein the carrier unit has a base body and a bracing element;
wherein the guide section is arranged within the bracing element;
wherein the bracing element is configured to be inserted into a cavity on the base body and be attached to the base body in at least one of a force-fitting and form-fitting;
wherein the transmission element has a slide section configured to slide with clearance on the guide section; and
wherein at least one of the slide section includes a wear-reducing material and the guide section includes a wear-reducing coating.

2. The brake unit of claim 1, wherein the first receiving section and the second receiving section are arranged at two opposite sides of the transmission element and are arranged substantially coaxially relative to each other.

3. The brake unit of claim 1, wherein the transmission element has a wear-reducing material in at least one of the first receiving section and the second receiving section.

4. The brake unit of claim 3, wherein the slide section has two cylinder sections on the lateral surfaces of the two cylinder sections the transmission element is guided in the guide section, wherein the cylinder sections are spaced apart from each other along the guide axis and separated by an intermediate space.

5. The brake unit of claim 4, wherein the slide section has at least one of a projection and a recess, which can be made to engage with a corresponding other of at least one of a recess and a projection of the guide section to secure the transmission element against rotation about the guide axis relative to the carrier unit.

6. The brake unit of claim 1, wherein the transmission element has a maximum length along the guide axis and a maximum width transverse to the guide axis, and wherein the relationship of the width to the length is in a range of 0.5-2.

7. The brake unit of claim 6, wherein the relationship of the width to the length is in the range of 0.8-1.6.

8. The brake unit of claim 7, wherein the relationship of the width to the length is in the range of 1.2-1.4.

9. The brake unit of claim 1, wherein at least one of the first receiving section and the second receiving section has at least one of a recess and a funnel-shaped cavity, into which the respective corresponding at least one of the piston rod and the tappet may be inserted.

10. The brake unit of claim 9, wherein the at least one of the recess and the funnel-shaped cavity of the at least one of the first receiving section and of the second receiving section has an opening angle, and wherein the opening angle has values of 5°-45°.

11. The brake unit of claim 10, wherein the opening angle has values of 15°-30°.

12. The brake unit of claim 11, wherein the opening angle has values of 23°-25°.

13. The brake unit of claim 1, wherein at least one of the first receiving section and the second receiving section has a receiving surface, wherein the first receiving surface has a first mean radius of curvature, wherein the second receiving surface has a second mean radius of curvature, and wherein the first radius of curvature is larger than the second radius of curvature.

14. The brake unit of claim 13, wherein the relationship of the first radius of curvature to the second radius of curvature is 1-3.

15. The brake unit of claim 14, wherein the relationship of the first radius of curvature to the second radius of curvature is 1.2-2.

16. The brake unit of claim 15, wherein the relationship of the first radius of curvature to the second radius of curvature is 1.5-1.6.

17. The brake unit of claim 1, wherein the transmission element is pretensioned in the direction of the piston rod.

18. The brake unit of claim 1, wherein the bracing element is held to the base body by a sleeve element, and wherein between the bracing element and the sleeve element there is at least one of a force-fit and a form-fit.

19. The brake unit of claim 18, wherein the sleeve element and the wedge unit comprise a single-piece, and wherein the wedge unit rests against the base body on a surface, which is transverse to the guide direction.

20. The brake unit of claim 1, wherein the wear-reducing coating of the guide section includes at least one of an insert, a metal coating, a fiber-reinforced ceramic material, and a polytetrafluoroethylene coating.

21. A brake unit for utility vehicles, comprising:
a carrier unit; and
a transmission element;
wherein the carrier unit has a guide section, in which the transmission element is arranged such that the transmission element can be moved along a guide axis;
wherein the transmission element comprises a first receiving section configured to be engaged with a piston rod of a brake cylinder, and a second receiving section configured to be engaged with a tappet of a wedge unit;
wherein the transmission element is configured to transmit forces and displacements along the guide axis between the piston rod and the tappet;
wherein the carrier unit has a base body and a bracing element;
wherein the guide section is arranged within the bracing element; and
wherein the bracing element is configured to be inserted into a cavity on the base body and be attached to the base body in at least one of a force-fitting and form-fitting;
wherein the transmission element has a slide section configured to slide with clearance on the guide section; and
wherein the guide section includes a wear-reducing coating.

* * * * *